(12) United States Patent
Diver, Jr. et al.

(10) Patent No.: US 7,077,532 B1
(45) Date of Patent: Jul. 18, 2006

(54) SOLAR REFLECTION PANELS

(75) Inventors: Richard B. Diver, Jr., Albuquerque, NM (US); James W. Grossman, Albuquerque, NM (US); Michael Reshetnik, Boulder, CO (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/543,622

(22) Filed: Apr. 5, 2000

(51) Int. Cl.
*G02B 7/182* (2006.01)

(52) U.S. Cl. ...................... 359/871; 359/855

(58) Field of Classification Search ............... 359/838, 359/850, 855, 868–871
See application file for complete search history.

(56) References Cited

U.S. PATENT DOCUMENTS

| | | | | |
|---|---|---|---|---|
| 4,238,265 A | * | 12/1980 | Deminet | 156/221 |
| 4,320,164 A | * | 3/1982 | Nicolas et al. | 428/167 |
| 4,547,432 A | * | 10/1985 | Pitts et al. | 428/448 |
| 4,963,012 A | * | 10/1990 | Tracy et al. | 359/514 |
| 5,071,596 A | * | 12/1991 | Goela et al. | 264/1.21 |

OTHER PUBLICATIONS

Stone, K.W. et al., 1993, "Status of Glass Reflector Technology for Heliostats and Concentrators," Proceedings of the 28th Intersociety Energy Conversion Engineering Conference, Atlanta, GA.
Solar Kinetics, Inc. Innovative Concentrator Panels (Schertz, P.T., 1986, "Design of a Point-Focus Concentrator," Proceedings of the Solar Thermal Technology Conference, Diver, R.B. (ed.), SAND 86-0536, Sandia National Laboratories, Albuquerque, NM.).
General Electric Parabolic Dish Concentrator (the PDC-1 used a reflective film) (Sobczak, I.F., Pons, R.L., Thostesen, T., 1982, "Development Status of The PDC-1 Parabolic Dish Concentrator," Parabolic Dish Solar Thermal Power Annual Program Review Proceedings, DOE/JPL-1060-52, Pasadena, CA.
Diver, R.B., et al., "Sandwich Construction Solar Structural Facets," *1999 ASME International Solar Energy Conference*, Maui, HI, Apr. 11-14, 1999.
Argoud, M.J., "Test Bed Concentrator Mirrors," Proceedings of the First Semiannual Distributed Receiver Systems Program Review, DOE/Jet Propulsion Laboratory—1060-33, Pasadena, CA (1980).
Bean, J.R., et al., "Technical Status of the Dish/Stirling Joint Venture Program," Proceedings of the 30th Intersociety Energy Conversion Engineering Conference, Paper No. 95-202, Orlando FL (1995).

(Continued)

*Primary Examiner*—Drew A. Dunn
*Assistant Examiner*—Joshua L. Pritchett
(74) *Attorney, Agent, or Firm*—Jeffery D. Myers; Robert D. Watson

(57) ABSTRACT

A solar collector comprising a glass mirror, and a composite panel, wherein the back of the mirror is affixed to a front surface of the composite panel. The composite panel comprises a front sheet affixed to a surface of a core material, preferably a core material comprising a honeycomb structure, and a back sheet affixed to an opposite surface of the core material. The invention may further comprise a sealing strip, preferably comprising EPDM, positioned between the glass mirror and the front surface of the composite panel. The invention also is of methods of making such solar collectors.

11 Claims, 1 Drawing Sheet

OTHER PUBLICATIONS

Beniga, K., et al., "An Improved Design for Stretched-Membrane Heliostats," Sandia Corporation, SAND89-7027, Albuquerque NM (1989).

Beniga, K., et al., "Performance Results for the SAIC/STM Prototype Dish/Stirling Systems," Proceedings of the 1997 ASME International Solar Energy Conference, Washington DE (1997).

Gill, S.R., "Fabrication of Four Focusing Solar Collector Segments of Widely Differing Geometries from Fiber-Reinforced Polymer Honeycomb Composite Panels," Sandia National Laboratories Final Report, Albuquerque NM (Apr. 17, 1997).

McDonnell Douglas "NREL Final Report—Solar Thermal Component Manufacturing for Near-Term Marketes," Boeing Company, Subcontract ZAP5-15299-02, Golden CO (Apr. 1998).

Overly, P.T., "Innovative Point Focus Solar Design, Task 1, 2a, Topical Report," DOE-AL/23711-1, Albuquerque NM (1985).

Saydah, A.R., et al., "Final Report on Test of STEP, Shenandoah Parabolic Dish Solar Collector Quadrant Facility," Sandia National Laboratories, Albuquerque NM, SAND82-7153 (Apr. 1983).

* cited by examiner

SOLAR REFLECTION PANELS

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to solar collector panels and the methods of making the same.

2. Background Art

Low-cost/high-performance solar collectors are needed to make solar thermal power competitive with other power sources. Incorporation of mirrors into commercially viable panels is the key to low-cost, high-performance solar collectors. In the 1970's and 1980's and with the financial support of the U.S. government, substantial development and test activities were directed toward the development of glass reflector designs for central receiver heliostats, parabolic trough collectors, and point focus concentrators ("solar collectors"). However, many problems surfaced with a majority of the solar collectors, such as the formation of dimples due to adhesion forces exerted on the glass, and the seepage of water between the bonded mirror and support resulting in silver corrosion of the mirror and consequent loss of solar reflectivity.

Glass-foam core mirrors were developed by the Jet Propulsion Laboratory (JPL). At JPL glass mirrors were mechanically deformed and bonded to a foamed glass support that had been ground to a specified contour. To minimize debonding of the glass mirror to the support, materials with similar thermal expansion coefficients were used. Argoud, M. J., 1980, "Test Bed Concentrator Mirrors," Proceedings of the First Semiannual Distributed Receiver Systems Program Review, DOE/JPL-1060-33, Pasadena, Calif. Steel-substrate supports were used in the McDonnell Douglas dish concentrator. Stone, K. W. et al., 1993, "Status of Glass Reflector Technology for Heliostats and Concentrators," Proceedings of the $28^{th}$ Intersociety Energy Conversion Engineering Conference, Atlanta, Ga. This design entailed bonding glass mirrors to a steel sheet, which in turn was supported by a stretch-formed or stamped steel backup structure (like the support found in a car hood). A similar type of support, but with rib supports stretch-formed or stamped to the desired curvature, were used by Acurex in their Innovative Concentrator design and by Solar Kinetics, Inc. (SKI) on the Shenandoah dishes. However, both the Accurex and the Solar Kinetics concentrators used reflective film technology rather than glass mirrors. Overly, et al., 1985, "Innovative Point Focus Solar Design, Task 1, 2a, Topical Report," DOE-AL/23711-1, Albuquerque, N. Mex., and Saydah et al., 1983, "Final Report on Test of STEP Shenandoah Parabolic Dish Solar Collector Quadrant Facility," SAND82-7153, Sandia National Laboratories, Albuquerque, N. Mex. Lastly, fiberglass supports formed over a mandrel have been investigated by Kansas Structural (Gill, S. R., Plunkett, J. D., 1997, "Fabrication of Four Focusing Solar Collector Segments of Widely Differing Geometries From Fiber-Reinforced Polymer Honeycomb Composite Panels," Final Report Submitted to Sandia National Laboratories, Albuquerque, N. Mex.) and McDonnell Douglas (NREL Final Report, 1998, "Solar Thermal Component Manufacturing for Near-Term Markets," Subcontract ZAP-5-15299-02, Golden, Colo.)

Some of most promising early efforts to develop solar collector mirror panels used sandwich-type construction. In sandwich-type construction, membranes, such as sheet steel, aluminum, or plastic, are bonded to both sides of a core material. This type of construction is widely utilized in products ranging from doors and tables to aircraft and boats and is characterized by high strength-to-weight ratios. In the case of solar collectors, glass mirrors are adhesively bonded to one of the membranes. Examples of sandwich construction mirrors include the Solar One heliostat mirrors (Stone, et al., 1993), the Solar Kinetics, Inc. Innovative Concentrator Panels (Schertz, P. T., 1986, "Design of a Point-Focus Concentrator," Proceedings of the Solar Thermal Technology Conference, Diver, R. B. (ed.), SAND86-0536, Sandia National Laboratories, Albuquerque, N. Mex.), the General Electric Parabolic Dish Concentrator (the PDC-1 used a reflective film) (Sobczak, I. F., Pons, R. L., Thostesen, T., 1982, "Development Status of The PDC-1 Parabolic Dish Concentrator," Parabolic Dish Solar Thermal Power Annual Program Review Proceedings, DOE/JPL-1060-52, Pasadena, Calif.), and the Cummins Utility-Scale dish concentrator. Some of the early prototype trough mirrors also used sandwich-type construction mirrors.

Recently, stretched-membrane designs incorporating membranes of plastic or steel stretched over both sides of a ring have received a lot of attention. In the stretched membrane design, vacuum in the plenum between the membranes is used to create the required curvature. Examples include LaJet/Cummins panels, the SAIC USJVP dish and several heliostat designs. Bean, J. R., Diver, R. B., 1995, "Technical Status of the Dish/Stirling Joint Venture Program," Proceedings of the $30^{th}$ Intersociety Energy Conversion Engineering Conference, Paper Number 95-202, Orlando, Fla.; Beninga, K., Butler, B., Sandubrae, J., Walcott, K., 1989, "An Improved Design for Stretched-Membrane Heliostats," SAND89-7027, Albuquerque, N. Mex.; and Beninga, K, Davenport, R. L., Sellars, J. A., Smith, D., Johansson, S., 1997, "Performance Results for the SAIC/STM Prototype Dish/Stirling System," Proceedings of the 1997 ASME International Solar Energy Conference, Washington, D.C. Stretched-membrane solar collectors with plastically deformed metal membranes have been developed by Solar Kinetics, Inc. Schertz P. E., P. T., Brown, D. C. Konnerth III, A., 1991, "Facet Development for a Faceted Stretched-Membrane Dish by Solar Kinetics, Inc.," SAND91-7009, Sandia National Laboratories, Albuquerque, N. Mex.; and Schlaich, J., Bergermann, R., Schiel, W., 1994, "Solar Stretch," *Civil Engineering*.

In spite of the considerable activity put toward the development of solar collectors, there remains the need for a cost effective, solar collector that is durable and has good optical properties.

SUMMARY OF THE INVENTION
(DISCLOSURE OF THE INVENTION)

The present invention is a solar collector comprising a glass mirror and a composite panel, wherein the back of said mirror is affixed to a front surface of the composite panel. The composite panel comprises a front sheet affixed to a surface of a core material, preferably a core material comprising a honeycomb structure, and a back sheet affixed to an opposite surface of the core material. The invention may further comprise a sealing strip, preferably comprising EPDM, positioned between the glass mirror and the front surface of the composite panel. In the preferred embodiment, the glass mirror comprises a silvered backing and the front sheet and back sheet comprise carbon steel of approximately 24 gauge. Also, the honeycomb core material comprises aluminum preferably constructed from approximately 0.015 and 0.004 inch aluminum foil. In alternative embodiments, the core material comprises foam selected from the group consisting of polystyrene, polyurethane, and polyvinyl chloride, or a cellulose based material.

The invention is also of a method of making a solar collector comprising the following steps: affixing a glass mirror, preferably a glass mirror comprising a silvered backing, to a front sheet to make a glass/sheet laminate; affixing the sheet side of the laminate to a surface of a core material; affixing a back sheet to an opposite surface of the core material to make a composite panel; and shaping the composite panel to a specific curvature by curing the composite panel over a mandrel of approximately inverse curvature. The invention may further comprise the step of positioning a sealing strip, preferably a sealing strip comprising EPDM, between the glass mirror and front sheet to minimize the accumulation of moisture between the glass mirror and front sheet. The preferred method of producing multiple solar collectors comprises stacking a plurality of the composite panels atop a single mandrel. A vacuum is then applied to the composite panel in contact with the mandrel.

An alternative method of making a solar collector comprises the following steps: affixing a glass mirror, preferably a glass mirror comprising a silvered backing, to a front sheet to make a glass/sheet laminate; placing the glass/sheet laminate mirror side down over a mandrel of specific curvature; applying a coating of an expandable foam, preferably an expandable foam selected from the group consisting of polystyrene, polyurethane, and polyvinyl chloride, on the sheet side of the laminate; positioning a back sheet in a frame such that as the foam expands the foam comes in contact with a surface of the back sheet and forces the composite panel to adopt the inverse shape of the mandrel; and removing the frame from the back sheet and the composite panel from the mandrel.

A primary object of the present invention is to provide a solar collector constructed from low cost materials and with low cost manufacturing procedures.

Another object of the invention is to provide a solar collector that is durable to environmental stresses such that the desired optical properties are maintained over many years.

A primary advantage of the present invention is the relative low cost materials used to construct the solar collector.

Another advantage of the present invention is the relative low cost manufacturing process used to construct the solar collector.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
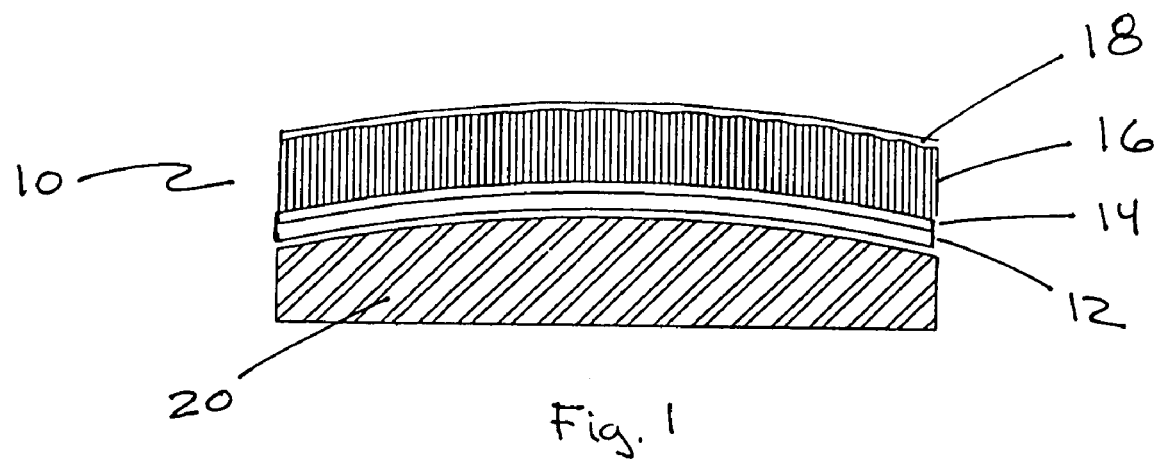
FIG. 1 is a schematic of the invention formed to the desired contour over a pre-formed mandrel.

A schematic depicting the sandwich-construction, structural panel 10 is shown in FIG. 1. The panel comprises a glass mirror 12 bonded to a front metal sheet 14, a core material 16, and a back metal sheet 18. A seal (not shown) positioned about the edges of the mirror and front sheet laminate prevents water from coming in contact with the silver surface of the glass mirror, and thereby prevents electrochemical corrosion and consequent loss of solar reflectivity. Also, by bonding the entire surface of the glass mirror to the front metal sheet the integrity of the mirror is maintained even if a portion of the mirror cracks or breaks. Thus, a broken solar collector can still operate and function safely.

In the preferred embodiment, the front 14 and back 18 metal sheet comprises carbon steel of similar or equal gauge, preferably 24 to 28 gauge. Carbon steel sheets with surface treatments such as electro-galvanizing are low cost, provide corrosion resistance, and enhance adhesion. The steel sheets are bonded to the core 16 with adhesive. Adhesive is applied to the front metal sheet 14 to bond the glass mirror 12. The constructed panel 10 is then laid atop a mandrel 20 pre-shaped to a desired degree of curvature. The panel 10 and mandrel 20 are placed inside a sealed enclosure and a partial vacuum is applied. This process is generally known as vacuum bagging, and is used to provide uniform loads between the surface of the glass mirror 12 and the front metal sheet 14 while the adhesive is curing. The partial vacuum also facilitates the shaping of the constructed panel 10 to the mandrel 20. Preferably, two part adhesive systems such as epoxy or acrylic, with working times of 10–90 minutes are used. The adhesive bonds between the front and back metal sheets and core "lock-in" the inverse curvature of the mandrel to give the desired shape to the solar collector.

The use of front and back metal sheets of similar material is important to the thermal stability of the panel, and therefore the maintenance of good optical characteristics over a range of ambient temperatures. The thermal expansion coefficient of steel (typically about $10.8–12.6 \times 10^{-6}$ m/m° C. ($6–7 \times 10^{-6}$ in/in ° F.)) is a good match to glass ($5.4–12.6 \times 10^{-6}$ m/m° C. ($3–7 \times 10^{-6}$ in/in ° F.), depending on composition). In contrast, the expansion coefficient of aluminum alloys (approximately $21.6 \times 10^{-6}$ m/m° C. ($12–10^{-6}$ in/in ° F.) and plastics ($45–54 \times 10^{-6}$ m/m° C. ($25–30 \times 10^{-6}$ in/in ° F.)) are much higher than that of glass. The relatively close thermal-expansion-coefficient match of steel and glass minimizes thermally induced stresses and optical distortions. Second, the relatively high elastic modulus of steel, approximately 207,000 MPa ($30 \times 10^6$ psi) vs. 69,000 MPa ($10 \times 10^6$ psi) for glass, assures that the sandwich structure dominates the glass and maintains the shape as the temperature changes. Third, since the steel front and back sheets of the sandwich composite possess the same or similar thermal characteristics minimal changes in curvature occurs as the temperature changes.

The sandwich-type construction results in panels with excellent mechanical and optical properties. For the most part, the dimension of the constructed panels were approximately 0.5×0.6-m (20×24-inch). The radii-of-curvatures of the mandrels were 10.668, 13.208, and 15.748 meters (420, 520, and 620 inches). Optical characteristics on the resulting mirrored panels were evaluated by Video Scanning Optical Test (VSHOT) as described in Jones, S. A., Gruetzner, J. K., Houser, R. M., Edgar, R. M., Wendelin, T. J., 1997, "VSHOT Measurement Uncertainty and Experimental Sensitivity Study," Proceedings of the $32^{nd}$ Intersociety Energy Conversion Engineering Conference, Honolulu, Hi. Durability was determined by optical characterization both before and after environmental testing. Environmental testing was intended to evaluate structural and optical degradation from exposure to the environment. Silver corrosion and degradation was not an issue of interest. Tests ranged from exposure to elevated temperatures (>50° C.) to thermal cycling with high humidity.

Silvered mirror comprising 1 mm thick low-iron glass was obtained from Naugatuck Glass. It is important to minimize the handling of the mirror during every stage of fabrication. The silvered mirror 12 is attached to the front metal sheet 14 to form a glass/steel laminate. The adhesive used to prepare the glass/steel laminate was 3M Y966 because it was least likely to corrode or otherwise disturb the mirror backings. Moreover, it lays down more easily without bubbles, and its liner peels back more trouble-free than other film adhesives. Also, a rubber sealing strip, preferably comprising solid EPDM, was positioned internal to the glass/steel laminate. Although the EPDM cannot be tinted white in a way that will not compromise its qualities white paint was applied. Also, the EPDM seal does not tend to accumulate heat the way metal a metal strip would. Pressure-sensitive acrylic tape, similar to the 3M Y966, was used to hold the rubber sealing strips in position. Bron tape BT 2979 was selected for low cost, strength, and ease of application.

Core materials comprising polystyrene, polyurethane, polyvinyl chloride (PVC) foams, and cardboard and aluminum honeycomb were evaluated. Core materials of polystyrene and urethane foams were found to be unstable at elevated temperatures (>50° C.). The preferred core used in the panels was ⅜" cell commercial grade, ¼" thick aluminum core. The core used was commercial grade core made with 0.002" or 0.003" foil.

The metal sheets in the composite panels was 24 gauge electrogalvanized (Paintlok). The metal sheets should be free of dimples or "half-moon" dents because such defects could transfer distortion to the mirror. The adhesive chosen to bond the steel faces to the aluminum core was EA 150 HI-PRO, custom manufactured for Paneltec by Epoxy Formulations, Inc., of Englewood, Colo. In some cases the panels were heated within the vacuum enclosure during the cure process to insure an overnight cure, and allowing for daily recycling of the mandrel and consequent increase in production efficiency. HYSOL 9394 was chosen for holding mounting pads to the backs of the panels. Its paste consistency helps hold the material from migrating from the bond-line.

Under some circumstances, it may be necessary to keep the panels from reaching extreme environmental temperatures. Such temperatures could possibly weaken the epoxy laminating adhesive and cause distortion in the curvature of the solar collector. To alleviate the heating problem, the backs of the composite panels were coated with Sherwin-Williams DTM (direct-to-metal) gloss white exterior latex, with suitable surface preparation to insure adhesion.

INDUSTRIAL APPLICABILITY

The invention is further illustrated by the following non-limiting examples.

EXAMPLE 1

Two techniques have been employed to produce sandwich-type construction panels—vacuum bagging and foam-in-place. In vacuum bagging, the glass/steel laminate was laid mirror surface down onto a mandrel (as shown in FIG. 1). Adhesive was applied to the back of the glass/steel laminate and to one side of the back steel skin. A core material was placed between the steel skins in contact with the adhesive. The sandwich was then covered with and sealed inside a plastic sheet and a partial vacuum was applied. The partial vacuum results in a high and uniform clamping force that facilitates the curing process, and forces the steel and glass sheets to conform to the pre-determined shape of the mandrel. Vacuums ranging from 381 to 584 mm of mercury (15 to 23 inches of mercury) were used. The inverse curvature of the mandrel is translated or locked into the composite panel.

A mirror segment was laid face down on the table, adhesive was pulled from the roll and stuck down at the far edge of the mirror, overhanging all edges, then pressed by hand to the mirror back, avoiding bubbles. The adhesive was cut from the roll and cut flush to the edges of the mirror with a razor knife. The side of the front sheet to be bonded to the mirror was wiped with denatured alcohol and a clean cloth to remove any grease that might interfere with lamination. A ½" wide strip of acrylic film tape was applied along all edges, for attachment of a rubber edge closure at the time of lamination.

A steel front sheet was laid down with two adjacent edges registering against fences to align the edges of the sheet to the edges of the mirror segments. Pressure was applied over the entire surface with j-rollers. After adhering the mirror to the front sheet, an edge of the glass/sheet laminate was lifted and a support sheet of double-wall cardboard or other lightweight, thin material was inserted below the newly laminated face sheet. This provides additional stiffness in handling and a protective interlayer, as the glass/sheet laminate was slid off its fixture and stacked onto a pal let to await bonding to the honeycomb.

Aluminum core was obtained as slices, rather than expanded sheets, to minimize freight costs. The core was dimensioned to provide material for 2 panels per slice, thus minimizing labor in expanding the core. Expansion was done on a 5'×10' table with specially built frames to which the honeycomb was pinned. One frame was fixed to the table, the other frame was moveable. With the specially built frames several pieces of core could be pinned and expanded simultaneously. Following core expansion the cores were trimmed to final size.

Figure 2:
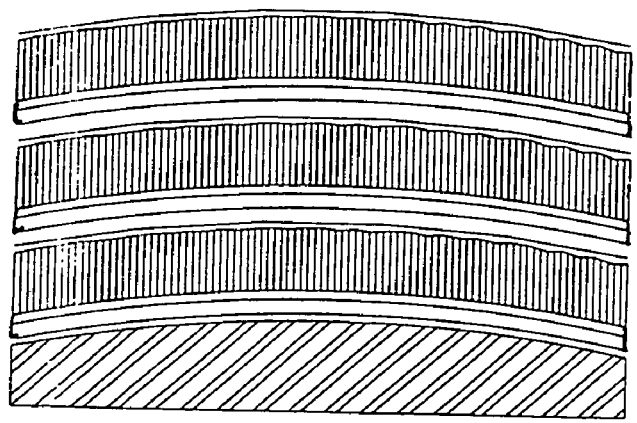
FIG. 2 is a schematic of the invention illustrating the shaping of multiple solar collectors by stacking several structured panels over a single mandrel.

Because of the prohibitive cost of mandrels and the long cure times required, we evaluated the affect of stacking on optical accuracy (see FIG. 2). The ability to manufacture optical elements from secondary mandrels is a key to reducing manufacturing costs. Stacks of material were arranged around the roll-coating machine. Laminated mirror and steel face sheets were on a scissors-lift table to allow them to be slid laterally with minimal flexure onto the 1½" thick foam backing-board on which they ride through the roll-coater. Laminating cradles were positioned near the out-feed of the roll-coater and cut-to-size plastic sheeting was laid over the cradles to be sealed over a stack of 8 panels and one mandrel so that a vacuum can be drawn.

The roll-coater was loaded with epoxy and a face sheet was fed through. Then the tape liner was pulled from the edges of the steel, exposing a ½" wide strip of acrylic adhesive. Pre-cut lengths of rubber edge closure were then laid down on the acrylic adhesive and the face sheet was placed on the laminating cradle, beginning the stacking procedure. A piece of honeycomb core was laid within the perimeter of rubber. A steel back sheet was fed through the roll-coater, inverted over the laminating cradle and placed down on the exposed honeycomb and rubber of the other half of the panel. The cradle has a "fence" at one side to facilitate alignment of the material. Material for 3 more panels was stacked, for a total of four composite panels atop a single, one-sided mandrel.

Alternatively, a total of 8 panels can be formed and shaped simultaneously by using a single, double-sided mandrel. Materials for four panels are prepared, arranged in proper sequence, and stacked. A double-sided mandrel is placed on top of the stacked materials. Then materials for four more panels are placed on the opposite side of the mandrel. In effect, both sides of a single mandrel are used, with materials for four panels each on the top and materials for four more panels beneath the mandrel. The stacked materials are then placed in a vacuum bag or chamber and a partial vacuum is applied.

At this point, insulating boards and a rack of infrared lights were fastened in place around the cradle. The stack was heated to 115° F. and allowed to cure overnight. The enclosure was dismantled the following morning and the vacuum bag opened when the stack reached room temperature. The mounting pads were then attached to the back of the composite panels.

EXAMPLE 2

The foam in place technique was performed exclusively with two-part urethane foams. Typically, a North Carolina Foam Industries, Inc. pour-in-place system (#811-91) was used. Typical foam density ranged from about 70.4 kg/m$^3$ to 83.3 kg/m$^3$ (4.4 to 5.2 lb/ft$^3$) and was inversely proportional to cure temperature. With this technique, the glass/steel laminate was laid mirror surface down on the mandrel, as in the vacuum bag technique. The two-part urethane foam was then mixed, poured, and spread onto the back of the glass/steel laminate. The back steel sheet was then placed directly onto the foam. A frame spaced at a set distance from the mandrel secured the back steel sheet in place as the foam expanded and forced the foam to ooze from the sides of the sandwich. The force of the expanding foam forced the glass/steel laminate to conform to the mandrel. After the foam cured, the curvature of the mandrel was locked into the composite panel. The frame was then removed and the excess foam was trimmed from the edges.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A solar collector comprising:
   a curved glass mirror comprising a single, continuous curved surface;
   a curved front sheet comprising a single, continuous curved surface, wherein the curved front sheet has the same curvature as the curved glass mirror;
   a core comprising a core material selected from the group consisting of a honeycomb structure, a foam selected from the group consisting of polystyrene, polyurethane, and polyvinyl chloride, and a cellulose based material; and
   a back sheet having a thermal expansion coefficient similar to that of said front sheet;
   wherein a back of said mirror is affixed to said front sheet; said front sheet is affixed to said core; and said core is affixed to said back sheet.

2. The solar collector of claim 1 further comprising a sealing strip positioned between said glass mirror and said front sheet.

3. The solar collector of claim 1 wherein said sealing strip comprises EPDM.

4. The solar collector of claim 1 wherein said glass mirror comprises a silvered backing.

5. The solar collector of claim 1 wherein said front sheet and back sheet comprise carbon steel.

6. The solar collector of claim 5 wherein said carbon steel front sheet and carbon steel back sheet comprise a gauge between approximately 24 and 28 gauge.

7. The solar collector of claim 1 wherein said core material comprises a honeycomb structure.

8. The solar collector of claim 7 wherein said honeycomb core material comprises aluminum.

9. The solar collector of claim 8 wherein said aluminum honeycomb core material comprises aluminum foil between approximately 0.015 and 0.002 inch foil.

10. The solar collector of claim 1 wherein said core material comprises a foam selected from the group consisting of polystyrene, polyurethane, and polyvinyl chloride.

11. The solar collector of claim 1 wherein said core material comprises a cellulose based material.

* * * * *